United States Patent
Goodsitt et al.

(10) Patent No.: US 11,816,432 B2
(45) Date of Patent: Nov. 14, 2023

(54) SYSTEMS AND METHODS FOR INCREASING ACCURACY IN CATEGORIZING CHARACTERS IN TEXT STRING

(71) Applicant: Capital One Services, LLC, McLean, VA (US)

(72) Inventors: Jeremy Edward Goodsitt, Champaign, IL (US); Galen Rafferty, Mahomet, IL (US); Anh Truong, Champaign, IL (US); Austin Walters, Savoy, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 322 days.

(21) Appl. No.: 17/171,270

(22) Filed: Feb. 9, 2021

(65) Prior Publication Data
US 2022/0253602 A1 Aug. 11, 2022

(51) Int. Cl.
G06F 40/279 (2020.01)
G06N 3/08 (2023.01)
G06N 3/04 (2023.01)

(52) U.S. Cl.
CPC .......... *G06F 40/279* (2020.01); *G06N 3/04* (2013.01); *G06N 3/08* (2013.01)

(58) Field of Classification Search
CPC .......... G06F 40/279; G06N 3/04; G06N 3/08; G06N 3/045
See application file for complete search history.

(56) References Cited

U.S. PATENT DOCUMENTS 5,542,006 A * 7/1996 Shustorovich ... G06V 30/18057
382/173
2019/0103091 A1* 4/2019 Chen .................. G06N 3/08
(Continued)

FOREIGN PATENT DOCUMENTS

WO WO-2020078818 A1 * 4/2020 ............. G06N 20/00

OTHER PUBLICATIONS

Radford, Alec, et al. "Improving language understanding by generative pre-training." (2018)., hereinafter as Radford. (Year: 2018).*
(Continued)

*Primary Examiner* — Bhavesh M Mehta
*Assistant Examiner* — Philip H Lam
(74) *Attorney, Agent, or Firm* — TROUTMAN PEPPER HAMILTON SANDERS LLP; Christopher J. Forstner; John A. Morrissett (57) ABSTRACT

Disclosed embodiments may include a method that includes setting an influence level for each index that a neural network can accept in one sample to a same level for a neural network, receiving a training corpus including training input samples and a corresponding correct training prediction samples, generating, using the neural network, prediction samples, identifying an accuracy for each index by comparing the prediction samples with the corresponding correct training prediction samples, adjusting the influence level for each index based on the accuracy for each index, identifying one or more poorly accurate indexes for the neural network, receiving a first input sample including one or more characters, generating one or more normalized first input samples by applying one or more buffers to the one or more poorly accurate indexes, and generating, using the neural network, a categorization of each character in the one or more normalized first input samples.

18 Claims, 5 Drawing Sheets

(56) References Cited

U.S. PATENT DOCUMENTS

| | | | | |
|---|---|---|---|---|
| 2019/0340235 A1* | 11/2019 | Osbourne | ............ | G10L 19/083 |
| 2019/0384973 A1* | 12/2019 | Suriyanarayanan | .. | H04L 67/306 |
| 2020/0258498 A1* | 8/2020 | Reisswig | ................ | G06F 40/30 |
| 2020/0294489 A1* | 9/2020 | Ding | ....................... | G10L 15/22 |
| 2021/0256420 A1* | 8/2021 | Elisha | ...................... | G06N 5/04 |
| 2021/0365677 A1* | 11/2021 | Anzenberg | ............ | G06V 10/82 |

OTHER PUBLICATIONS

Lahoti, P. et al., "Fairness without Demographics through Adversarially Reweighted Learning," 34th Conference on Neural Information Processing Systems (NeurIPS 2020), Nov. 3, 2020.

* cited by examiner

SYSTEMS AND METHODS FOR INCREASING ACCURACY IN CATEGORIZING CHARACTERS IN TEXT STRING

FIELD

The disclosed technology relates to systems and methods for increasing accuracy in categorizing characters in text string.

BACKGROUND

Natural language processing (NLP) involves how to program computers to process and analyze natural language data to help a computer understand the language data. Current models (NLP solutions) may attempt to do this by attempting to categorize characters in a given text string (e.g., alphanumeric characters or nonalphanumeric characters such as symbols) using input indexes. However, current models lose accuracy at certain positions in a text string (e.g., at the beginning or the end) in the categorization prediction. Thus, the overall accuracy of the current models is less accurate than desired and may possibly be unreliable.

Accordingly, there is a need to increase the accuracy of categorizing characters in a text string by determining the expected accuracy at the ends of text strings for predictions and to increase the accuracy of corresponding indexes. Embodiments of the present disclosure are directed to this and other considerations.

SUMMARY

Disclosed embodiments may include a system that includes one or more processors and a memory in communication with the one or more processors and storing instructions are configured to cause the communication system to perform a method. The method may include setting an influence level for each index of a plurality of indexes that a neural network can accept in one sample to a same level for a neural network. The method may also include receiving a training corpus comprising a plurality of training input samples and a corresponding plurality of correct training prediction samples. The method may also include generating, using the neural network, a plurality of prediction samples. The method may also include identifying an accuracy for each index by comparing the plurality of prediction samples with the corresponding plurality of correct training prediction samples. The method may also include adjusting the influence level for each index based on the accuracy for each index. The method may also include identifying one or more poorly accurate indexes in the plurality of indexes for the neural network. The method may also include receiving a first input sample comprising one or more characters. The method may also include generating one or more normalized first input samples by applying one or more buffers to the one or more poorly accurate indexes. The method may also include generating, using the neural network, a categorization of each character in the one or more normalized first input samples.

Disclosed embodiments may include a system that includes one or more processors and a memory in communication with the one or more processors and storing instructions are configured to cause the communication system to perform a method. The method may include set an influence level for each index of a plurality of indexes that a neural network can accept in one sample to a same level for a neural network. The method may also include receiving a training corpus comprising a plurality of training input samples and a corresponding plurality of correct training prediction samples. The method may also include generating, using the neural network, a plurality of prediction samples. The method may also include identifying an accuracy for each index by comparing the plurality of prediction samples with the corresponding plurality of correct training prediction samples. The method may also include adjusting the influence level for each index based on the accuracy for each index.

Disclosed embodiments may include a system that includes one or more processors and a memory in communication with the one or more processors and storing instructions are configured to cause the communication system to perform a method. The method may include identifying one or more poorly accurate indexes in a plurality of indexes for a neural network. The method may also include receive a first input sample comprising one or more characters. The method may also include generating one or more normalized first input samples by applying one or more buffers to the one or more poorly accurate indexes. The method may also include generating, using the neural network, a categorization of each character in the one or more normalized first input samples.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
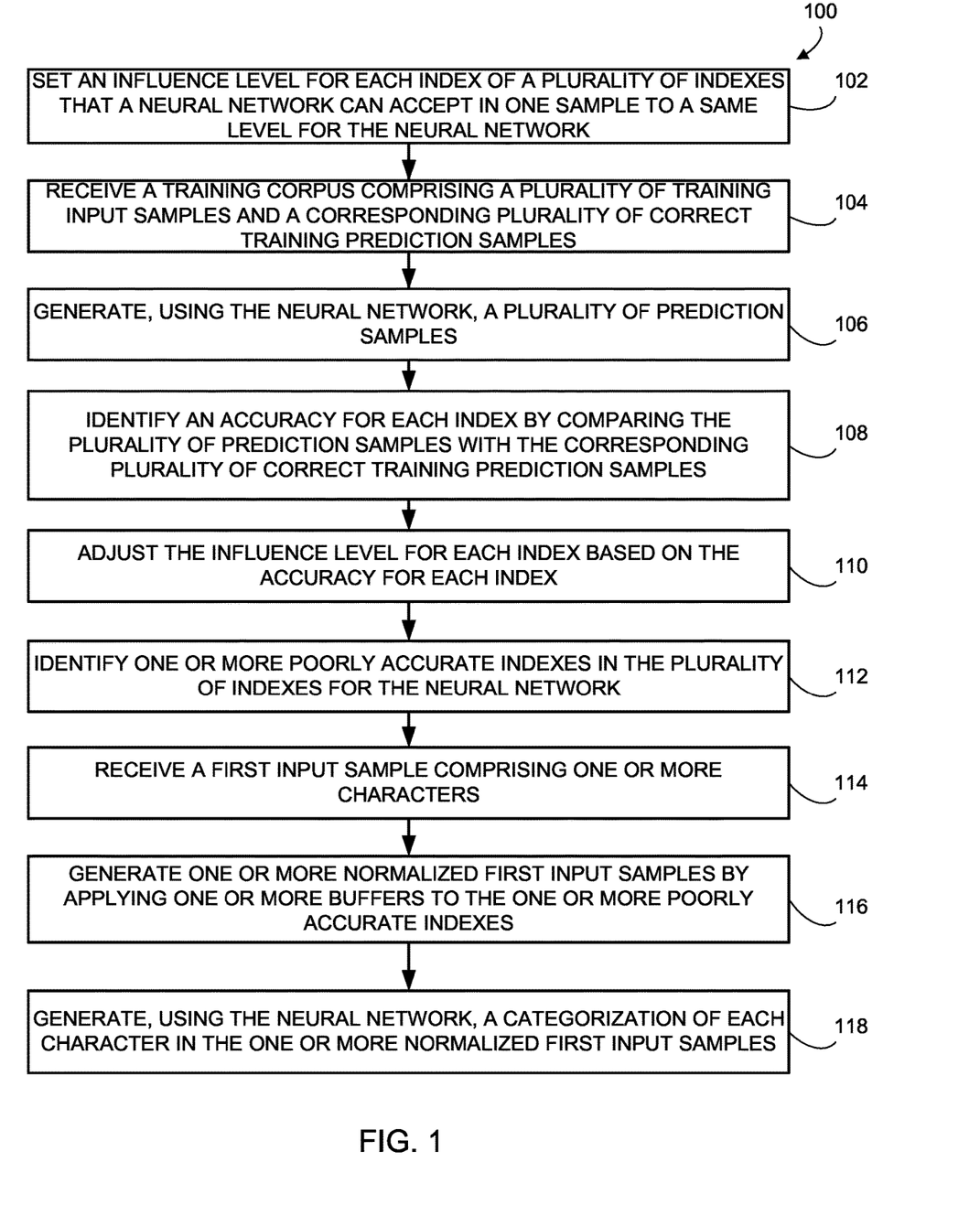
FIG. 1 is a flow diagram illustrating an exemplary method 100 for increasing accuracy in categorizing characters in text string, in accordance with certain embodiments of the disclosed technology.

FIG. 1 is a flow diagram illustrating an exemplary method 100 for categorizing characters in text string with increased accuracy, in accordance with certain embodiments of the disclosed technology. The steps of method 100 may be performed by one or more components of a text labeling system 508 (e.g., a character categorizing system 420 or a web server 510), as described in more detail with respect to FIGS. 4 and 5.

In block 102, the text labeling system 508 (e.g., a character categorizing system 420) may set an influence level for each index of a plurality of indexes that a neural network (e.g., a convolutional neural network (CNN)) can accept in one sample to the same level for the neural network.

In block 104, the text labeling system 508 (e.g., a character categorizing system 420) may receive a training corpus including a plurality of training input samples and a corresponding plurality of correct training prediction samples. The corresponding plurality of correct training prediction samples include a categorization or labeling of each character in each of the plurality of training input samples. For example, the correct training prediction samples may include one or more characters labeled as sensitive information (e.g., social security, account number, birthdate, address) while the remaining one or more characters may be labeled as basic information. In this way, the neural network can be trained to recognize target information (e.g., sensitive information) from other general information.

In block 106, the text labeling system 508 (e.g., a character categorizing system 420) may generate, using the neural network, a plurality of prediction samples. As an example, the text labeling system may label or categorize each of the plurality of input training samples as being a particular character type (e.g., name entity recognition) or general information. As another example, the text labeling system 508 (e.g., a character categorizing system 420) may label or categorize each character for each of the plurality of input training samples as being either sensitive information or general information.

In block 108, the text labeling system 508 (e.g., a character categorizing system 420) may identify an accuracy for each of index of the plurality of indexes by comparing the plurality of prediction samples with the corresponding plurality of correct training prediction samples. The text labeling system 508 (e.g., a character categorizing system 420) may identify a lower accuracy of the for indexes at or near the ends and a higher accuracy for indexes near the middle. For example, for neural network that only accepts five indexes at a time, the following may be an accuracy profile for the indexes:

TABLE 1

Example Index Accuracy Profile for Neural Network

| Index # | 1 | 2 | 3 | 4 | 5 |
|---|---|---|---|---|---|
| Accuracy | 42% | 95% | 98% | 68% | 60% |

As shown, the first, fourth, and fifth indexes have accuracies under 70%, whereas the second and the third indexes have accuracy that are 95% and above.

In block 110, the text labeling system 508 (e.g., a character categorizing system 420) may adjust the influence level for each index based on the accuracy for each index. For example, if the accuracy of a particular index is poor or low (e.g., 42%), the text labeling system 508 (e.g., a character categorizing system 420) may adjust the influence level for that index to have full influence (100%) whereas if the accuracy of a particular index is doing well or high (e.g., 98%), the text labeling system 508 (e.g., a character categorizing system 420) may adjust the influence level for that index to (50%). Predetermined thresholds (e.g., 70% or less) may be used to determine whether the accuracy of a particular index is considered a poor performer or low. Other algorithms besides thresholding may be used to determine appropriate influence relative to accuracy and accuracy of characters surrounding it.

Blocks 104 through 110 may be repeated one or more times with the same or different training corpus until a set number of predetermined iterations are performed. In some embodiments, the text labeling system 508 (e.g., a character categorizing system 420) may also calculate an overall accuracy for the training corpus and determine whether the overall accuracy for the training corpus is above a predetermined overall accuracy threshold. The text labeling system 508 (e.g., a character categorizing system 420) may iteratively repeat blocks 104 through 110 as well as calculate the overall accuracy for the training corpus and determine whether the overall accuracy for the training corpus is above the predetermined overall accuracy threshold until the text labeling system 508 (e.g., a character categorizing system 420) has determined that the overall accuracy for the training corpus is above the predetermined overall accuracy threshold.

In block 112, the text labeling system 508 (e.g., a character categorizing system 420) may identify one or more poorly accurate indexes in the plurality of indexes for the neural network. For example, the text labeling system 508 (e.g., a character categorizing system 420) may determine whether the accuracy of one or more indexes are below a predetermined accuracy threshold (e.g., 70%). It is noted that identifying one or more poorly accurate indexes may be done prior to adjusting (block 110) the influence level for each index based on the accuracy for each index and the identification of the one or more poorly accurate indexes may be taken into account when adjusting the influence levels.

In block 114, the text labeling system 508 (e.g., a character categorizing system 420) may receive a first input sample comprising one or more characters.

In block 116, the text labeling system 508 (e.g., a character categorizing system 420) may generate one or more normalized first input samples by applying one or more buffers (or pads) to the one or more poorly accurate indexes.

In block 118, the text labeling system 508 (e.g., a character categorizing system 420) may generate, using the neural network, a categorization of each character in the one or more normalized first input samples.

Example first input sample and normalized first input samples for a CNN that accepts five character strings (meaning that the model can only predict five characters simultaneously):

First input sample: [a, b, c, d, e, f, g, h, i, j, k, l]

Normalized input samples and character recognition:

[PAD, a, b, c, d]=>a, b
[b, c, d, e, f]=>c, d
[d, e, f, g, h]=>e, f

[f, g, h, i, j]=>g, h
[h, i, j, k, l]=>i, j
[j, k, l, PAD, PAD]

Here, the buffer window is 1 on the left and 2 on the right. By sending normalized samples that overlap except for the highly accurate indexes and use buffers (e.g., PADs) for buffer window at the end of the sample, the system can achieve even higher accuracy in predicting/categorizing characters.

Examples of using buffers or repeating characters to normalize an input sample are shown below:
x=is bad prediction
G=good prediction
[x G G x x]=Model will accept sample with 5 indexes
sample=[a, b, c, d, e, f, g, h, i, j, k, l]
PAD_sample=[PAD, a, b, c, d, e, f, g, h, i, j, k, l, PAD, PAD]
circular_sample=[l, a, b, c, d, e, f, g, h, i, j, k, l, a, b]
mirror_sample=[b, a, b, c, d, e, f, g, h, i, j, k, l, k, j]

Figure 2:
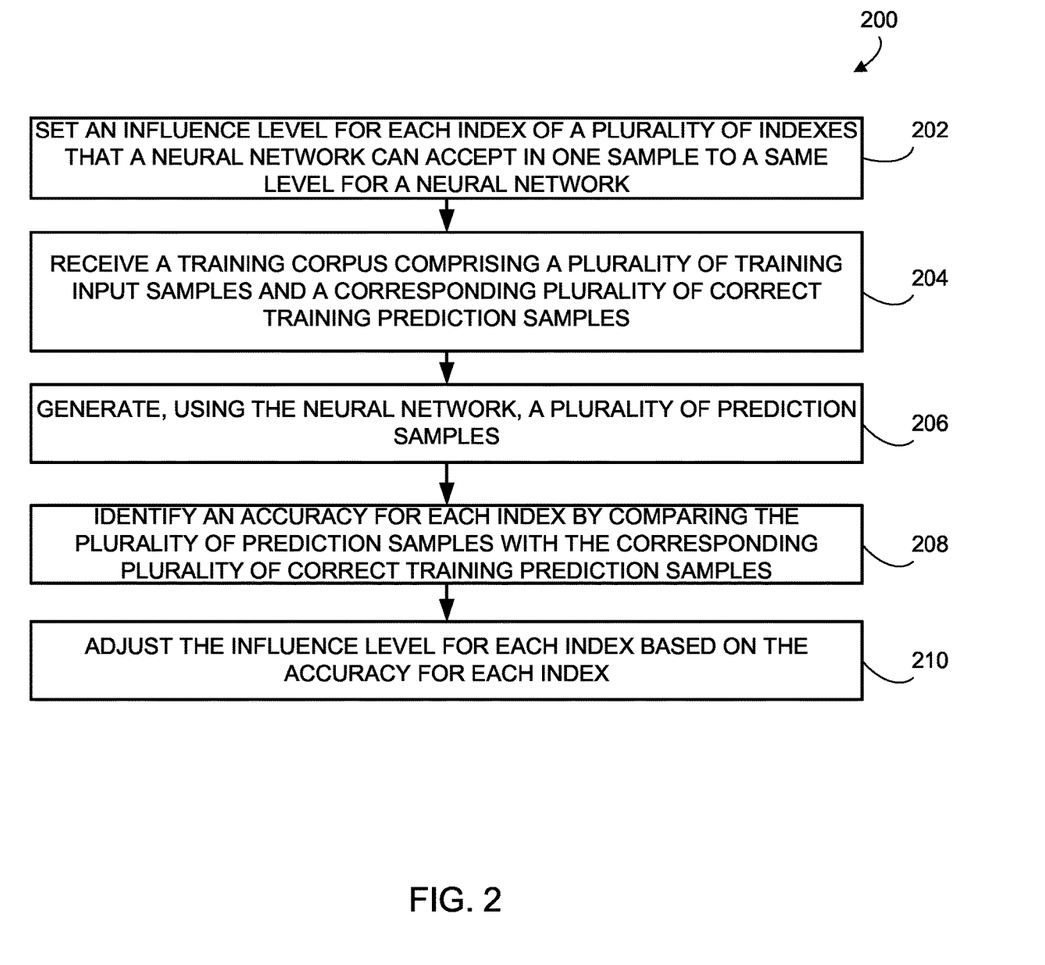
FIG. 2 is a flow diagram illustrating an exemplary method 200 for increasing accuracy in categorizing characters in text string, in accordance with certain embodiments of the disclosed technology.

In some embodiments, the system (and neural network) may be designed to label and categorize sensitive information as sensitive. An example of input samples and output is below for a neural network that is designed to recognize social security numbers:
Input Sample: This is a social security #: 123-45-7890
Target Categorization: BBBBBBBBBBBBBBBBBBBB-BBBBBBBBBBSSSSSSSSSSS
Normalized Samples with outputs:
[PAD, T, h, i, s]=>BB
[h, i, s, , i]=>BB
[s, , i, , a]=>BB
[i, , a, , s]=>BB
[a, , s, o, c]=>BB
[s, o, c, i, a]=>BB
[c, i, a, l, ]=>BB
[a, l, , s, e]=>BB
[ , s, e, c, u]=>BB
[e, c, u, r, i]=>BB
[u, r, i, t, y]=>BB
[i, t, y, , #]=>BB
[y, , #, :, ]=>BB
[#, :, , 1, 2]=>BB
[ , 1, 2, 3, -]=>SS
[2, 3, -, 4, 5]=>SS
[-, 4, 5, -, 7]=>SS
[5, -, 7, 8, 9]=>SS
[7, 8, 9, 0, PAD]=>SS
[9, 0, PAD, PAD, PAD]=>S
Result: BBBBBBBBBBBBBBBBBBBBBBBBBBBBBB-SSSSSSSSSS FIG. 2 is a flow diagram illustrating an exemplary method 200 for categorizing characters in text string with increased accuracy, in accordance with certain embodiments of the disclosed technology. The steps of method 200 may be performed by one or more components of a text labeling system 508 (e.g., a character categorizing system 420 or a web server 510), as described in more detail with respect to FIGS. 4 and 5.

Method 200 of FIG. 2 is similar to method 100 of FIG. 1, except that method 200 does not include blocks similar to blocks 112, 114, 116, and 118. The descriptions of blocks 202, 204, 206, 208, and 210 in method 200 are the same as or similar to the respective descriptions of blocks 102, 104, 106, 108, and 110 of method 100 and are not repeated herein for brevity.

Figure 3:
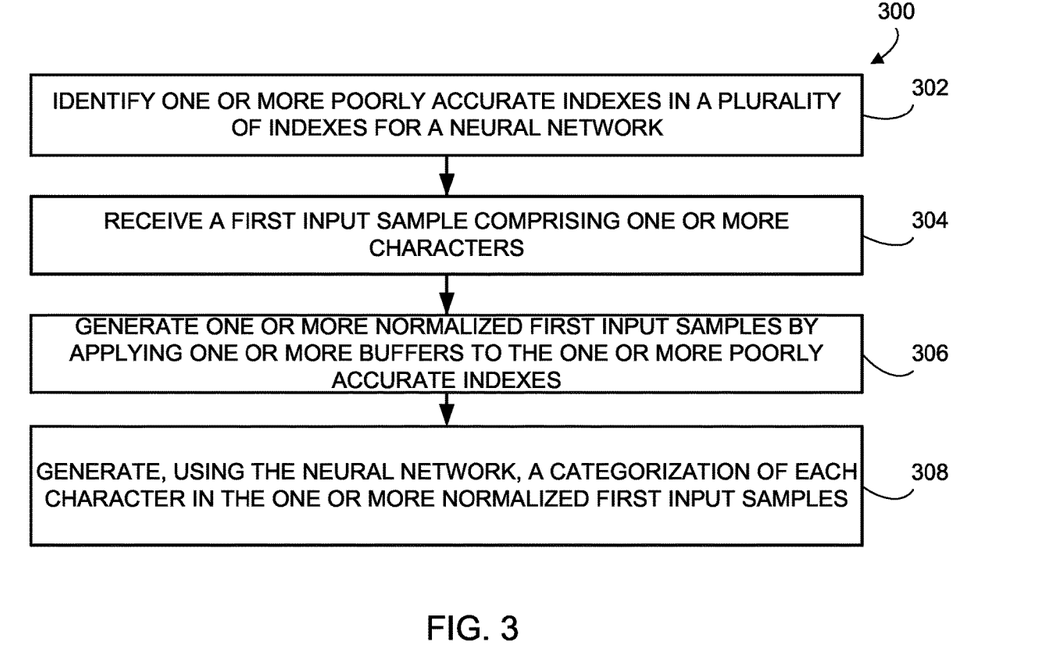
FIG. 3 is a flow diagram an exemplary method 300 for increasing accuracy in categorizing characters in text string, in accordance with certain embodiments of the disclosed technology.

FIG. 3 is a flow diagram illustrating an exemplary method 300 for categorizing characters in text string with increased accuracy, in accordance with certain embodiments of the disclosed technology. The steps of method 300 may be performed by one or more components of a text labeling system 508 (e.g., a character categorizing system 420 or a web server 510), as described in more detail with respect to FIGS. 4 and 5.

Method 300 of FIG. 3 is similar to method 100 of FIG. 1, except that method 300 does not include blocks similar to blocks 102, 104, 106, 108, and 110. The descriptions of blocks 302, 304, 306, and 308 in method 300 are the same as or similar to the respective descriptions of blocks 112, 114, 116, and 118 of method 100 and are not repeated herein for brevity.

Figure 4:
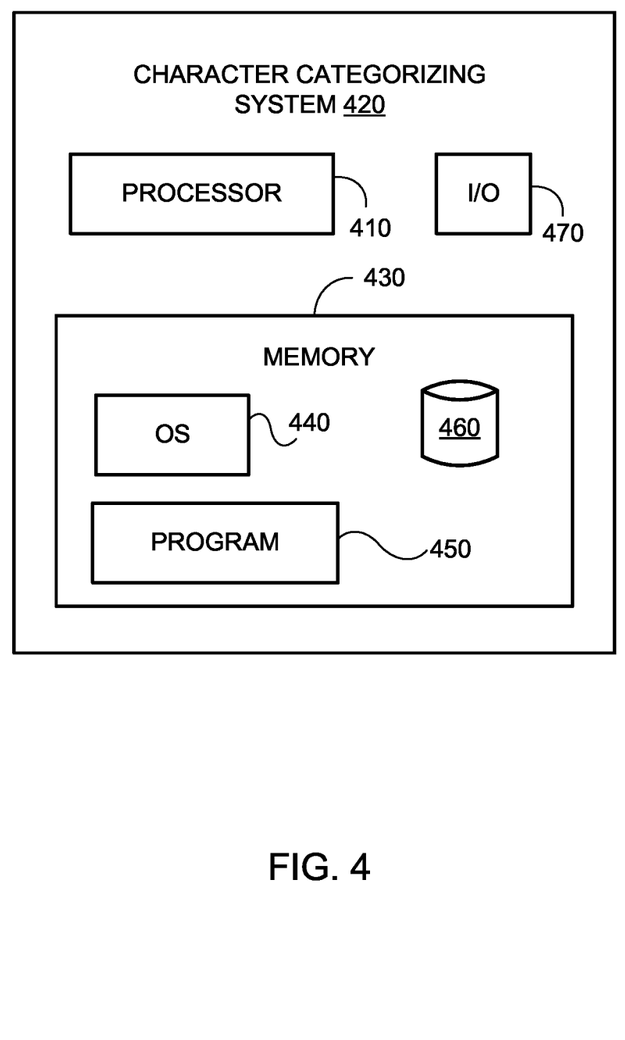
FIG. 4 is a block diagram of a character categorizing system 420 used to categorize characters in text string with increased accuracy, according to an example implementation of the disclosed technology.
Figure 5:
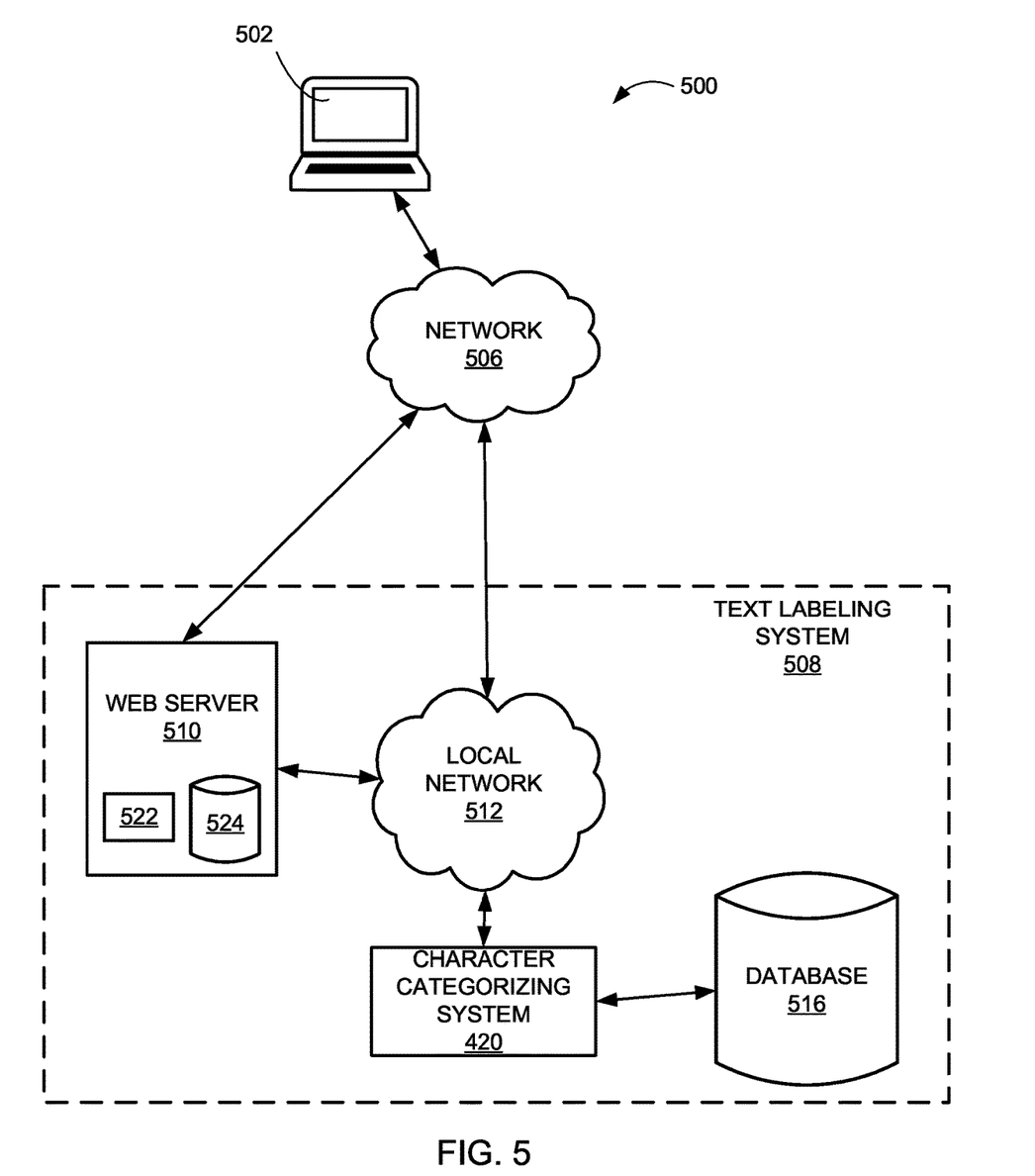
FIG. 5 is a block diagram of an example system 500 that may be used to increase categorize characters in text string with increase accuracy, according to an example implementation of the disclosed technology.

FIG. 4 is a block diagram of the example character categorizing system 420, as also depicted in FIG. 5. According to some embodiments, the user device 502 and the web server 510 as depicted in FIG. 5 and described below, may have a similar structure and components that are similar to those described with respect to character categorizing system 420 shown in FIG. 4. As shown, the character categorizing system 420 may include a processor 410, an input/output ("I/O") device 420, a memory 430 containing an operating system ("OS") 440 and a program 450. In certain example implementations, the character categorizing system 420 may be a single server or may be configured as a distributed computer system including multiple servers or computers that interoperate to perform one or more of the processes and functionalities associated with the disclosed embodiments. In some embodiments, the character categorizing system 420 may further include a peripheral interface, a transceiver, a mobile network interface in communication with the processor 410, a bus configured to facilitate communication between the various components of the character categorizing system 420, and a power source configured to power one or more components of the character categorizing system 420

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 410 to communicate with other devices via wired or wireless networks, whether local or wide area, private or public, as known in the art. A power source may be configured to provide an appropriate alternating current (AC) or direct current (DC) to power components.

The processor 410 may include one or more of a microprocessor, microcontroller, digital signal processor, co-processor or the like or combinations thereof capable of executing stored instructions and operating upon stored data. The memory 430 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 430.

The processor 410 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 410 may be a single core processor that is configured with virtual processing technologies. In certain embodiments, the processor 310 may use logical processors to simultaneously execute and control multiple processes. The processor 410 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the character categorizing system 420 may include one or more storage devices configured to store information used by the processor 410 (or other components) to perform certain functions related to the disclosed embodiments. In one example, the character categorizing system 420 may include the memory 430 that includes instructions to enable the processor 410 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the character categorizing system 420 may include a memory 430 that includes instructions that, when executed by the processor 410, perform one or more processes consistent with the functionalities disclosed herein. Methods, systems, and articles of manufacture consistent with disclosed embodiments are not limited to separate programs or computers configured to perform dedicated tasks. For example, the character categorizing system 420 may include the memory 430 that may include one or more programs 450 to perform one or more functions of the disclosed embodiments. For example, in some embodiments, the character categorizing system 420 may additionally manage dialogue and/or other interactions with the customer via a program 450.

The processor 410 may execute one or more programs 450 located remotely from the system 500 (such as the system shown in FIG. 5). For example, the system 500 may access one or more remote programs 450, that, when executed, perform functions related to disclosed embodiments.

The memory 430 may include one or more memory devices that store data and instructions used to perform one or more features of the disclosed embodiments. The memory 430 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 430 may include software components that, when executed by the processor 410, perform one or more processes consistent with the disclosed embodiments. In some embodiments, the memory 430 may include a categorizing database 460 for storing related data to enable the character categorizing system 420 to perform one or more of the processes and functionalities associated with the disclosed embodiments.

The categorizing database 460 may include stored data relating to a text string. According to some embodiments, the functions provided by the categorizing database 460 may also be provided by a database that is external to the character categorizing system 420, such as the database 516 as shown in FIG. 5.

The character categorizing system 420 may also be communicatively connected to one or more memory devices (e.g., databases) locally or through a network. The remote memory devices may be configured to store information and may be accessed and/or managed by the character categorizing system 420. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The character categorizing system 420 may also include one or more I/O devices 470 that may comprise one or more interfaces for receiving signals or input from devices and providing signals or output to one or more devices that allow data to be received and/or transmitted by the character categorizing system 420. For example, the character categorizing system 420 may include interface components, which may provide interfaces to one or more input devices, such as one or more keyboards, mouse devices, touch screens, track pads, trackballs, scroll wheels, digital cameras, microphones, sensors, and the like, that enable the character categorizing system 420 to receive data from one or more users (such as, for example, via the user devices 502A and 502B).

In example embodiments of the disclosed technology, the character categorizing system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the character categorizing system 420 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the character categorizing system 420 may include a greater or lesser number of components than those illustrated.

FIG. 5 is a block diagram of an example system 500 that may be used to increase categorize characters in text string with increase accuracy, according to an example implementation of the disclosed technology The components and arrangements shown in FIG. 5 are not intended to limit the disclosed embodiments as the components used to implement the disclosed processes and features may vary. As shown, system 500 may interact with a user device 502 via a network 506. In certain example implementations, the system 500 may include a web server 510 and a local network 512, character categorizing system 420, and a database 516.

In some embodiments, a customer may operate the user device 502. The user device 502 can include one or more of a mobile device, smart phone, general purpose computer, tablet computer, laptop computer, telephone, PSTN landline, smart wearable device, voice command device, other mobile computing device, or any other device capable of communicating with the network 506 and ultimately communicating with one or more components of the system 500. In some embodiments, the user device 502 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from an entity associated with the system 500. According to some embodiments, the user device 502 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 506 may be of any suitable type, including individual connections via the internet such as cellular or WiFi networks. In some embodiments, the network 506 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 506 may include any type of computer networking arrangement used to exchange data. For example, the network 506 may be the Internet, a private data network, virtual private network using a public network, and/or other suitable connection(s) that enable(s) components in the system 500 environment to send and receive information between the components of the system 500. The network 506 may also include a public switched telephone network ("PSTN") and/or a wireless network.

In accordance with certain example implementations, a third-party server may be in communication with the system 500 via the network 506. In certain implementations, the third-party server can include a computer system associated with an entity (other than the entity associated with the system 500 and its customers) that performs one or more functions associated with the customers.

The system 500 may be associated with and optionally controlled by an entity such as a business, corporation, individual, partnership, or any other entity that provides one or more of goods, services, and consultations to individuals such as customers. The system 500 may include one or more servers and computer systems for performing one or more functions associated with products and/or services that the organization provides. Such servers and computer systems may include, for example, the web server 510 as well as any other computer systems necessary to accomplish tasks associated with the organization or the needs of customers (which may be customers of the entity associated with the organization). The web server 510 may include a computer system configured to generate and provide one or more websites accessible to customers, as well as any other individuals involved in an organization's normal operations. The web server 510, for example, may include a computer system configured to receive communications from the user device 502 via for example, a mobile application, a chat program, an instant messaging program, a voice-to-text program, an SMS message, email, or any other type or format of written or electronic communication. The web server 510 may have one or more processors 522 and one or more web server databases 524, which may be any suitable repository of website data. Information stored in the web server 510 may be accessed (e.g., retrieved, updated, and added to) via the local network 512 (and/or the network 506) by one or more devices (e.g., the character categorizing system 420) of the system 500.

The local network 512 may include any type of computer networking arrangement used to exchange data in a localized area, such as WiFi, Bluetooth™ Ethernet, and other suitable network connections that enable components of the system 500 to interact with one another and to connect to the network 506 for interacting with components in the system 500 environment. In some embodiments, the local network 512 may include an interface for communicating with or linking to the network 506. In other embodiments, certain components of the system 500 may communicate via the network 506, without a separate local network 516.

In accordance with certain example implementations of the disclosed technology, the transaction translation system 420, which is described more fully below with reference to FIG. 5, may include one or more computer systems configured to compile data from a plurality of sources, such as the web server 510 and/or the database 516. The menu generating system 320 may correlate compiled data, analyze the compiled data, arrange the compiled data, generate derived data based on the compiled data, and store the compiled and derived data in a database such as the database 516. According to some embodiments, the database 516 may be a database associated with an organization and/or a related entity that stores a variety of information relating to customers, transactions, and business operations. The database 516 may also serve as a back-up storage device and may contain data and information that is also stored on, for example, databases 524 and 460, as discussed with reference to FIG. 4.

EXEMPLARY USE CASES

A system may train a convolutional neural network (CNN) to recognize (or categorize) sensitive characters (e.g., social security numbers, addresses, birthdates, or phone numbers) in a text string including alphanumeric characters. To do so, the system may set an influence level for each index of a plurality of indexes (e.g., 5 indexes) that the CNN can accept in one sample to the sample level for the CNN. For example, the CNN may set the influence level to full influence (e.g., 100 out of 100) for each index. Next, the system may receive a training corpus including a plurality of training input samples and a corresponding plurality of correct training prediction samples, each of the plurality of training input samples including alphanumeric characters. The plurality of correct training prediction samples includes categorization or label of each of the alphanumeric characters. The system may generate, using the CNN, a plurality of predictions samples. The system may identify an accuracy for each index by comparing the plurality of prediction samples with the corresponding plurality of correct prediction samples. The system may adjust the influence level for each index based on the accuracy for each index. The system may identify one or more poorly accurate indexes in the plurality of indexes for the CNN. The system may receive a first input sample including characters (e.g., alphanumeric characters and symbols). The system may generate one or more normalized first input samples by applying one or more buffers to the one or more poorly accurate indexes. The system may generate, using the CNN, a categorization of each character in the one or more normalized first input samples.

Example first input sample and normalized first input samples for a CNN that accepts five character strings (meaning that the model can only predict five characters simultaneously):

First input sample: [a, b, c, d, e, f, g, h, i, j, k, l]

Normalized input samples and character recognition:
[PAD, a, b, c, d]=>a, b
[b, c, d, e, f]=>c, d
[d, e, f, g, h]=>e, f
[f, g, h, i, j]=>g, h
[h, i, j, k, l]=>i, j
[j, k, l, PAD, PAD]

Here, the buffer window is 1 on the left and 2 on the right. By sending normalized samples that overlap except for the highly accurate indexes and use buffers (e.g., PADs) for buffer window at the end of the sample, the system can achieve even higher accuracy in predicting/categorizing characters.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
one or more processors; and
a memory in communication with the one or more processors and storing instructions are configured to cause the system to:
set an influence level for each index of a plurality of indexes that a neural network can accept in one sample to a same level for a neural network;
receive a training corpus comprising a plurality of training input samples and a corresponding plurality of correct training prediction samples;
generate, using the neural network, a plurality of prediction samples;
identify an accuracy for each index by comparing the plurality of prediction samples with the corresponding plurality of correct training prediction samples;
adjust the influence level for each index based on the accuracy for each index;
identify one or more poorly accurate indexes in the plurality of indexes for the neural network;
receive a first input sample comprising one or more characters;
generate one or more normalized first input samples by applying one or more buffers to the one or more poorly accurate indexes; and
generate, using the neural network, a categorization of each character in the one or more normalized first input samples,
wherein receiving the training corpus, generating the plurality of prediction samples, identifying the accuracy for each index, and adjusting the influence level for each index are iteratively repeated until a set number of predetermined iterations are performed.

2. The system of claim 1, wherein the instructions are further configured to cause the system to identify one or more characters types based on the categorization of each character.

3. The system of claim 2, wherein the one or more character types correspond to social security numbers, account numbers, phone numbers, addresses, or combinations thereof.

4. The system of claim 1, wherein the one or more normalized first input samples have overlapping characters.

5. The system of claim 1, wherein the neural network is a convolutional neural network.

6. The system of claim 1, wherein adjusting the influence level for each index based on the accuracy for each index comprises adjusting one or more highly accurate indexes of the plurality of indexes to lower influence levels than one or more poorly accurate indexes of the plurality of indexes.

7. The system of claim 1, wherein the training corpus for each iteration is a different training corpus.

8. The system of claim 1, wherein the instructions are further configured to cause the system to calculate an overall accuracy for the training corpus; and determine whether the overall accuracy for the training corpus is above a predetermined accuracy threshold.

9. The system of claim 8, wherein receiving the training corpus, generating the plurality of prediction samples, identifying the accuracy for each index, adjusting the influence level for each index, calculating the overall accuracy for the training corpus, and determining whether the overall accuracy for the training corpus is above the predetermined accuracy threshold iteratively repeated until the system determined that the overall accuracy for the training corpus is above the predetermined accuracy threshold.

10. A system, comprising:
one or more processors; and
a memory in communication with the one or more processors and storing instructions are configured to cause the system to:
set an influence level for each index of a plurality of indexes that a neural network can accept in one sample to a same level for a neural network;
receive a training corpus comprising a plurality of training input samples and a corresponding plurality of correct training prediction samples;
generate, using the neural network, a plurality of prediction samples;
identify an accuracy for each index by comparing the plurality of prediction samples with the corresponding plurality of correct training prediction samples; and
adjust the influence level for each index based on the accuracy for each index,
wherein adjusting the influence level for each index based on the accuracy for each index comprises adjusting one or more highly accurate indexes of the plurality of indexes to lower influence levels than one or more poorly accurate indexes of the plurality of indexes.

11. The system of claim 10, wherein the neural network is a convolutional neural network.

12. The system of claim 10, wherein receiving the training corpus, generating the plurality of prediction samples, identifying the accuracy for each index, and adjusting the influence level for each index are iteratively repeated until a set number of predetermined iterations are performed.

13. The system of claim 12, wherein the training corpus for each iteration is a different training corpus.

14. The system of claim 10, wherein the instructions are further configured to cause the system to calculate an overall accuracy for the training corpus; and determine whether the overall accuracy for the training corpus is above a predetermined accuracy threshold.

15. The system of claim 14, wherein receiving the training corpus, generating the plurality of prediction samples, identifying the accuracy for each index, adjusting the influence level for each index, calculating the overall accuracy for the training corpus, and determining whether the overall accuracy for the training corpus is above the predetermined accuracy threshold iteratively repeated until the system determined that the overall accuracy for the training corpus is above the predetermined accuracy threshold.

16. A system, comprising:
one or more processors; and
a memory in communication with the one or more processors and storing instructions are configured to cause the system to:
identify one or more poorly accurate indexes in a plurality of indexes for a neural network;
receive a first input sample comprising one or more characters;
generate one or more normalized first input samples by applying one or more buffers to the one or more poorly accurate indexes; and
generate, using the neural network, a categorization of each character in the one or more normalized first input samples, adjust an influence level for each index based on the accuracy for each index of the plurality of indexes,
wherein adjusting the influence level for each index based on the accuracy for each index comprises adjusting one or more highly accurate indexes of the plurality of indexes to lower influence levels than one or more poorly accurate indexes of the plurality of indexes.

17. The system of claim 16, wherein the one or more normalized first input samples have overlapping characters.

18. The system of claim 16, wherein the neural network is a convolutional neural network.

\* \* \* \* \*